United States Patent Office 3,410,798
Patented Nov. 12, 1968

3,410,798
BASIC, SULFURIZED PHENATES AND SALICYLATES AND METHOD FOR THEIR PREPARATION
Jerome M. Cohen, Cleveland, Ohio, assignor to The Lubrizol Corporation, Wickliffe, Ohio, a corporation of Ohio
No Drawing. Continuation-in-part of application Ser. No. 481,930, Aug. 23, 1965. This application May 23, 1967, Ser. No. 640,517
26 Claims. (Cl. 252—37.2)

ABSTRACT OF THE DISCLOSURE

Basic metal salts of phenol or salicylic acid sulfides are prepared by reacting a phenol or salicylic acid, or a salt thereof, with sulfur and an alkaline earth base at a temperature of about 150–200° C., in the presence of a carboxylic acid or salt thereof and a polyalkylene glycol or alkylene or polyalkylene glycol alkyl ether. The products are useful as detergent additives for lubricants.

---

This application is a continuation-in-part of copending application Ser. No. 481,930, filed Aug. 23, 1965.

This invention relates to new compositions of matter which are useful as lubricant additives, particularly detergent additives, and to methods for their preparation. More particularly, it relates to a method for the preparation of an oil-soluble, basic sulfurized alkaline earth metal phenate which comprises reacting, at a temperature above about 150° C., (A) a phenol, (B) sulfur and (C) an alkaline earth base, in the presence of (D) a carboxylic acid or an alkali metal, alkaline earth metal, zinc or lead salt thereof, and (E) a compound of the formula R(OR')$_x$OH, wherein R is hydrogen or alkyl, R' is alkylene and $x$ is an integer which is at least 2 if R is hydrogen and at least 1 if R is alkyl, said component E having a boiling point above about 150° C.; the ratio of the number of equivalents of component B to component A being between about 1:1 and 2:1 and the ratio of the number of equivalents of component C to component A being at least 2:1; and subsequently removing all volatile components from the reaction product.

Basic sulfurized alkaline earth metal phenates are valuable lubricant additives since they provide detergency and also perform other useful functions such as inhibiting corrosion, neutralizing acids and inhibiting gum formation. The acid-neutralizing ability of such additives is directly proportional to the percentage of alkaline earth metal base which can be incorporated therein. It is of interest, therefore, to prepare oil-soluble compounds of this sort which have the highest possible metal content.

A number of methods are known for the preparation of basic sulfurized alkaline earth metal phenates with varying amounts of metal. In general, however, it has been impossible to produce calcium salts which contain more than about 175% of the amount of calcium contained in the normal salt—that is, which have a metal ratio greater than 1.75. (The term "metal ratio" is used herein to denote the quotient obtained by dividing the number of chemical equivalents of metal actually incorporated into the compound by the number of chemical equivalents of metal which are contained in the normal metal salt. In the case of sulfurized phenates, the normal metal salt would, of course, contain two phenol moieties per atom of alkaline earth metal.)

A principal object of the present invention, therefore, is to provide a method for the production of overbased sulfurized alkaline earth metal phenates and similar compounds.

A further object is to provide a method for conveniently preparing lubricant additive compositions containing a high percentage of alkaline earth metal.

A further object is to provide novel compositions of matter which are useful as lubricant additives.

Other objects will in part be obvious and will in part appear hereinafter.

The method of this invention is useful for preparing basic, sulfurized alkaline earth metal phenates in a single-step reaction starting with the phenol, sulfur, and the alkaline earth base. By "alkaline earth" is meant the metals of Group II–A of the Periodic Table, particularly magnesium, calcium, strontium and barium. Of these, calcium and barium are those most frequently used in oil additives. Since a number of methods are known for the preparation of basic, sulfurized barium phenates (for example, the method described in U.S. Patent 2,766,291), this invention is chiefly directed to the preparation of calcium compounds. Hence, in the remainder of this specification reference will be made to calcium as the alkaline earth metal to be used; however, it is to be understood that the method is equally applicable to the other alkaline earth metals.

Component A in the method of this invention is a phenol. Any phenol, substituted or unsubstituted, may be used; also operative are hydroxy compounds derived from fused-ring hydrocarbons (e.g., naphthols and the like). The preferred compounds, however, are phenols substituted with alkyl radicals having at least about six carbon atoms and up to as many as 7,000 carbon atoms. Examples of such substituents include hexyl, cyclohexyl, heptyl, decyl, eicosyl, and radicals derived from the polymerization of olefins such as ethylene, propylene, 1-butene, 2-butene, isobutene and the like. Radicals derived from polymers of propylene, 1-butene and isobutene are preferred, especially those having a molecular weight of about 150–1750 (containing about 10–125 aliphatic carbon atoms). In some instances, however, a higher molecular weight radical, e.g., one having a molecular weight of about 50,000–100,000, is desirable since it has been found that such a radical can impart viscosity index improving properties to the composition.

The hydrocarbon substituent and the aryl nucleus of the phenol may contain other substituents such as hydroxy, carboxy, mercapto, halogen, nitro, amino, nitroso, sulfo and disulfo radicals. Particularly preferred in this regard are compounds containing carboxy substituents on the aryl nucleus, especially hydrocarbon-substituted silicylic acids. (In the latter case the products may be more accurately defined as salicylates rather than phenates, but the two are considered together herein.)

Introduction of the hydrocarbon substituent onto the phenol can be effected by mixing the hydrocarbon and the phenol at a temperature of about 50–200° C. in the presence of a suitable catalyst, such as aluminum trichloride, boron trifluoride, zinc chloride or the like. The radical can also be introduced by other alkylation processes known in the art. It is irrelevant which position on the phenolic ring is substituted; any single isomer, or a mixture of isomers, may be used. The mixture may also contain varying percentages of poly-substituted materials such as dialkyl and trialkyl phenols.

Hydrocarbon-substituted salicylic acids may be prepared from the phenols by the well-known "Kolbe reaction" which comprises reacting a salt, preferably an alkali metal salt, of the phenol with carbon dioxide. This reaction may be carried out at atmospheric or superatmospheric pressure in a suitable solvent, preferably mineral oil. If the Kolbe reaction does not go to completion, the product may still be sulfurized and overbased since both the phenates and salicylates are effective additives.

It is sometimes convenient to use alkali metal or alkaline earth metal salts of the phenols or salicylic acids, rather than the free acids, in the method of this invention. The normal calcium salts are preferred, and their use is especially advantageous when a basic sulfurized salicylate is being prepared. In general, the term "phenol" or "acid" when used herein includes salts thereof.

Component B of the method of this invention is sulfur, and component C is an alkaline earth metal base. The suitable metals are enumerated above. Any basic compound of these metals may be used, but the preferred bases are the oxides and hydroxides.

Component D is a carboxylic acid or an alkali metal, alkaline earth metal, zinc or lead salt thereof. The preferred carboxylic acids are those containing about 1–100 carbon atoms; they may be alkyl or aryl and saturated or unsaturated. The terms "alkyl" and "aryl" are intended to encompass hydrocarbon radicals as well as radicals which are substantially hydrocarbon in character. In the latter instance, the radicals may contain non-polar substituents such as halo, ether or nitro groups as long as these substituents do not interfere with the reaction of the method of this invention, and as long as they are not present in such proportions as to alter significantly the hydrocarbon character of the radical. The term "carboxylic acid" is meant to include monocarboxylic acids, dicarboxylic acids and other acids having a plurality of carboxyl groups.

Specific examples of suitable monocarboxylic acids for use as component D are formic acid, aectic acid, propionic acid, acrylic acid, capric acid, stearic acid, maleic acid and the like. The metal salts of these acids (and of similar polycarboxylic acids) are also useful and may be prepared by reacting the acid with a basic alkali metal, alkaline earth metal, zinc or lead compound. Examples of the useful salts are sodium acetate, lithium acetate, potassium stearate, calcium formate, calcium acetate, calcium salt of polyisobutene-substituted succinic acid, zinc acetate, lead propionate, and lead caprate. Aliphatic acids containing about 2–6 carbon atoms and alkaline earth metal salts thereof, especially acetic acid and calcium acetate, are preferred.

The amount of the acid or salt to be used is generally about 5–20 mole percent, and preferably about 5–10 mole percent, of the amount of the phenol in the reaction mixture.

Component E, as indicated, is a compound of the formula R(OR')$_x$OH wherein R is hydrogen or alkyl, R' is alkylene and $x$ is an integer which is at least 1 if R is alkyl and at least 2 if R is hydrogen. Thus, component E is a polyalkylene glycol or an alkylene glycol alkyl ether. The alkylene group (R') is preferably ethylene or propylene; $x$ is preferably 2 or 3; and R is preferably a $C_{1-5}$ alkyl group such as methyl, ethyl or butyl.

The boiling point of component E is important because of the necessity for a reaction temperature of at least about 150° C. Any compound which boils below that temperature will, of course, be lost by volatilization during the reaction. On the other hand, a compound with a boiling point substantially above 200° C. will be difficult to remove when the reaction is complete. Therefore, suitable compounds are those which boil above 150° C. and preferably below about 200° C. Especially effective, and preferred, are the mono-(lower alkyl) ethers, particularly the methyl and ethyl ethers, of diethylene glycol. These compounds are sold under the trade names "Methyl Carbitol" and "Carbitol," respectively.

For the purposes of this application, the term "equivalent weight" refers to the molecular or atomic weight of a substance divided by the number of monovalent reactive units which it provides or with which it will react. Thus, the equivalent weight of a monohydroxy phenol is equal to its molecular weight. The equivalent weight of a salicylic acid is also, in this specification, considered to be equal to its molecular weight. The equivalent weight of an alkaline earth base is half its molecular weight, since one molecule thereof will react with two acidic (e.g., phenolic or carboxylic) groups or their equivalent. The reaction which takes place between the phenol and sulfur in the present invention may be represented as follows (where Ar represents any aryl or alkaryl radical):

$$2H-ArOH + 2S \rightarrow HOAr-S-ArOH + H_2S$$

Accordingly, the equivalent weight of sulfur for the purpose of the present application is equal to its molecular weight, since equimolar quantities of sulfur and the phenol react. On this basis, the ratio of the number of equivalents of sulfur to phenol used in the present reaction should be between about 1:1 and 2:1, while the ratio of the number of equivalents of alkaline earth metal base to phenol is at least 2:1 and preferably between about 2:1 and 5:1.

In carrying out the method of this invention, the components are mixed and heated to a temperature above about 150° C., and preferably between about 150° C. and 200° C. Since the reaction proceeds only at temperatures above about 150° C., it is necessary that the reaction mixture contain no constituents which will be volatilized and lost below that temperature. Ordinarily, the reaction is carried out in a solvent or combination of solvents. Component E may serve as the solvent or at least as part of it; thus, it is usually present in considerable excess. Other materials which may be used as solvents include alcohols, ethers, ketones, hydrocarbons, chlorinated hydrocarbons and the like. The preferred solvent is a high-boiling mineral oil fraction, which is generally used in combination with component E.

Upon heating the reaction mixture to above about 150° C., there occurs evolution of hydrogen sulfide (formed by the reaction of sulfur with the phenol) and water (formed by the reaction of the calcium base with the phenol). Ordinarily, some solvent is also lost by volatilization at this stage. The volatilized material is preferably collected in a cooled receiver, and the evolved hydrogen sulfide may be conveniently absorbed in a caustic solution and measured as an index of the course of the reaction. When hydrogen sulfide evolution has ceased, the reaction is for practical purposes complete.

It is possible to obtain, by this method, materials with a metal ratio as high as 5 which are useful as lubricant additives. The behavior of some of these substances as additives is, however, improved by reaction with carbon dioxide. This reaction may be effected at a temperature between about 130° C. and 180° C., preferably about 160–170° C., by passing carbon dioxide through the reaction mixture.

After the reaction is complete (with or without carbonation), the volatile constituents are removed from the reaction mixture. The major part of this volatile matter generally comprises component E; it may be removed by distillation, preferably at reduced pressure. Distillation temperatures up to about 200° C. are adequate at pressures below about 50 millimeters of mercury.

The method of this invention is illustrated by the following examples. All parts and percentages are by weight.

EXAMPLE 1

A mixture of 485 parts (1 equivalent) of a polyisobutene-substituted phenol wherein the substituent has a molecular weight of about 400, 32 parts (1 equivalent) of sulfur, 74 parts (2 equivalents) of calcium hydroxide, 11 parts (0.14 equivalent) of calcium acetate, 485 parts of diethylene glycol monomethyl ether and 380 parts of mineral oil is heated at 120–205° C. under nitrogen for four hours. Hydrogen sulfide evolution begins as the temperature rises above 125° C. The material is allowed to distill and hydrogen sulfide is absorbed in a sodium hydroxide solution. Heating is discontinued when no further hydrogen sulfide absorption is noted; at this point, 443 parts of diethylene glycol monomethyl ether has been recovered by distillation. The remaining volatile material is removed by distillation at 95° C./10 mm. pressure. The distillation residue is filtered. The product thus obtained, a 60% solution in mineral oil, has a calcium sulfate ash content of 12.11%, a sulfur content of 2.02% and a metal ratio of 1.69.

EXAMPLE 2

Following the procedure of Example 1, a mixture of 485 parts (1 equivalent) of the phenol of Example 1, 32 parts (1 equivalent) of sulfur, 111 parts (3 equivalents) of calcium hydroxide, 16 parts (0.2 equivalent) of calcium acetate, 485 parts of diethylene glycol monomethyl ether and 414 parts of mineral oil is reacted under nitrogen. After removal of volatile matter and filtration, the product (a 60% solution in mineral oil) has a calcium sulfate ash content of 14.59%, a sulfur content of 2.12% and a metal ratio of 2.1.

EXAMPLE 3

The procedure of Example 1 is repeated with a mixture containing 485 parts (1 equivalent) of the phenol, 48 parts (1.5 equivalents) of sulfur, 111 parts (3 equivalents) of calcium hydroxide, 16 parts (0.2 equivalent) of calcium acetate, 485 parts of diethylene glycol monomethyl ether and 420 parts of mineral oil. The product has a calcium sulfate ash content of 17.15%, a sulfur content of 2.70% and a metal ratio of 2.56.

EXAMPLE 4

The procedure of Example 1 is followed with a mixture of 396 parts (1.5 equivalents) of a tetrapropylene-substituted phenol, 48 parts (1.5 equivalents) of sulfur, 111 parts (3 equivalents) of calcium hydroxide, 16 parts (0.1 mole) of calcium acetate, 396 parts of diethylene glycol monomethyl ether, and 320 parts of mineral oil. The product has a calcium sulfate ash content of 19.79%, a sulfur content of 3.21% and a metal ratio of 1.54.

EXAMPLE 5

The procedure of Example 4 is followed except that 72 parts (2.25 equivalents) of sulfur and 368 parts of mineral oil are used. The product has a calcium sulfate ash content of 20.37%, a sulfur content of 3.93% and a metal ratio of 1.71.

EXAMPLE 6

A mixture of 2910 parts (6 equivalents) of the phenol of Example 1, 192 parts (6 equivalents) of sulfur, 622 parts (16.8 equivalents) of calcium hydroxide, 93 parts (1.18 equivalents) of calcium acetate, 2910 parts of diethylene glycol monomethyl ether, and 2446 parts of mineral oil is heated to 190° C. in a nitrogen atmosphere. Hydrogen sulfide evolution begins at 125° C.; the hydrogen sulfide is absorbed in a caustic solution and reaction is continued until no more hydrogen sulfide is collected. At this stage, about 30% of the diethylene glycol monomethyl ether has been removed by distillation.

The reaction mixture is cooled to 165° C. and is blown with carbon dioxide for 1.3 hours. The remaining volatile matter is removed at 205° C./15 mm., and the residue is filtered. There is obtained a product (60% solution in mineral oil) with a calcium sulfate ash content of 16.90%, a sulfur content of 1.98% and a metal ratio of 2.4.

EXAMPLE 7

A mixture of 3395 parts (7 equivalents) of the phenol of Example 1, 224 parts (7 equivalents) of sulfur, 777 parts (21 equivalents) of calcium hydroxide, 117 parts (1.48 equivalents) of calcium acetate, 3395 parts of ethylene glycol monomethyl ether and 1600 parts of mineral oil is heated to 125–190° C. in a nitrogen atmosphere. Heating is continued until hydrogen sulfide evolution has ceased; then an additional 1345 parts of mineral oil is added and the material is blown with carbon dioxide for 45 minutes. After distillation of volatile materials, the product, a 60% solution in mineral oil, has a calcium sulfate ash content of 19.03%, a sulfur content of 2.10% and a metal ratio of 2.76.

EXAMPLE 8

Following the procedure of Example 6, 2910 parts (6 equivalents) of polyisobutenyl phenol, 256 parts (8 equivalents) of sulfur, 666 parts (18 equivalents) of calcium hydroxide, 100 parts (1.28 equivalents) of calcium acetate, 2910 parts of diethylene glycol monomethyl ether and 2567 parts of mineral oil are reacted at 125–190° C. After hydrogen sulfide evolution is complete, the mixture is cooled to 165° C. and is blown with carbon dioxide for 45 minutes. The volatile matter is then removed by distillation at 210° C./14 mm. and the product is filtered. There is obtained a solution with a calcium sulfate ash content of 17.08%, a sulfur content of 2.39% and a metal ratio of 2.5.

EXAMPLE 9

A reaction mixture identical with that of Example 3, except that the mineral oil content is 414 parts, is heated at 100–190° C. until hydrogen sulfide evolution has ceased. The diethylene glycol monomethyl ether which has been removed by distillation is replaced, and the mixture is blown with $CO_2$ at 165° C. for one hour. The product is distilled to remove volatile matter and filtered. There is obtained an oil solution containing 18.16% calcium sulfate ash and 2.57% sulfur, and having a metal ratio of 2.64.

EXAMPLE 10

The procedure of Example 9 is repeated with a mixture of 485 parts (1 equivalent) of polyisobutenyl phenol, 32 parts (1 equivalent) of sulfur, 185 parts (5 equivalents) of calcium hydroxide, 27 parts (0.34 equivalent) of calcium acetate, 550 parts of diethylene glycol monomethyl ether and 480 parts of mineral oil. The product has a calcium sulfate ash content of 21.34% and a sulfur content of 1.91%. The metal ratio is 3.56.

EXAMPLE 11

A mixture of 715 parts (1 equivalent) of a polyisobutenyl phenol wherein the polyisobutenyl radical has a molecular weight of about 600, 32 parts (1 equivalent) of sulfur, 148 parts (4 equivalents) of calcium hydroxide, 22 parts (0.28 equivalent) of calcium acetate, 750 parts of diethylene glycol monomethyl ether, and 600 parts of mineral oil is heated gradually to 185° C. in a stream of nitrogen. Hydrogen sulfide evolution is measured by collecting the sulfide in caustic. When hydrogen sulfide evolution has ceased, diethylene glycol monomethyl ether is added to replace the portion which has distilled. The solution is cooled to 165° C. and blown with carbon dioxide for one-half hour. The volatile matter is removed at 185° C./20 mm. and the product is filtered. The resulting 60% solution in mineral oil contains 15.39% calcium sulfate ash and 1.08% sulfur, and has a metal ratio of 3.42.

EXAMPLE 12

The method of Example 3 is repeated except that the promoter consists of 485 parts of diethylene glycol monoethyl ether and 9.6 grams (0.1 equivalent) of sodium propionate. A similar product is obtained.

EXAMPLE 13

The procedure of Example 7 is repeated, using a promoter system consisting of 446 parts (1.48 equivalents) of calcium oleate and 3395 parts of diethylene glycol monoethyl ether. A product similar to that of Example 7 is obtained.

EXAMPLE 14

To a solution of 460 parts (1 equivalent) of the polyisobutenyl phenol of Example 1, 11.4 parts (0.19 equivalent) of acetic acid, 482 parts of diethylene glycol monomethyl ether and 42.7 parts (1.33 equivalents) of sulfur in 393 parts of mineral oil, at 48–53° C., is added 112 parts (2.73 equivalents) of calcium hydroxide over 30 minutes. The mixture is heated to 185° C. over 5½ hours, and stirred at this temperature for 30 minutes. It is then cooled to 165° C. and blown with carbon dioxide for about 2½ hours. The volatile materials are removed by distillation at 210° C./25 mm. Hg and an additional 150 parts of oil are added. Upon filtration, there is obtained a 60% solution in oil of the basic calcium phenate which has a calcium content of 5.52%, a sulfur content of 2.4%, a calcium sulfate ash content of 18.75% and a metal ratio of 2.73.

EXAMPLE 15

To a solution of 2760 parts (6 equivalents) of the polyisobutenyl phenol of Example 1 in 2760 parts of mineral oil, at 60° C., is added 405 parts (6.15 equivalents) of potassium hydroxide. The solution is heated to 250° C. and the volatilized material (principally water but containing a small amount of mineral oil) is collected in a water trap. A nitrogen atmosphere is maintained during the entire reaction.

The potassium phenate thus produced is blown with carbon dioxide for 3 hours to a base number (phenolphthalein) of 14. The mixture is then cooled to 70° C. and a solution of 366.5 parts (6.6 equivalents) of calcium chloride in 1500 parts of methanol is added. The mixture is heated under reflux for 2 hours, after which time 800 parts of the methanol are removed by distillation and there are added 2700 parts of ethylene glycol monomethyl ether, 192 parts (6 equivalents) of sulfur, 342 parts (9.35 equivalents) of calcium hydroxide and 22 parts (0.25 equivalent) of calcium acetate monohydrate. The mass is heated to 189° C. under nitrogen for 4 hours, whereupon hydrogen sulfide is evolved. When hydrogen sulfide evolution has ceased, the mixture is cooled to 141° C. and blown with carbon dioxide for three hours. Upon filtration, there is obtained a 57% oil solution of a basic calcium salicylate having a calcium sulfate ash content of 17.0% and a sulfur content of 1.03%. The metal ratio is 2.6.

EXAMPLE 16

A solution of 918 parts (2 equivalents) of the polyisobutyl phenol of Example 1 and 132 parts (2 equivalents) of potassium hydroxide in 1006 parts of mineral oil is heated to 160° C. over 10 hours, under nitrogen. The water formed in the neutralization reaction is removed by distillation. When water evolution has stopped, the mixture is cooled to 140-145° C. and blown with carbon dioxide for 2½ hours.

To 878 parts (0.8 equivalent) of oil solution of potassium salicylate produced as described above is added a solution of 46 parts (0.8 equivalent) of calcium chloride in 180 parts of methanol. The mixture is heated under reflux for about 3 hours, and then 450 parts of ethylene glycol monomethyl ether, 25.6 parts (0.8 mole) of sulfur, 44.4 parts (1.2 equivalents) of calcium hydroxide and 7 parts (0.08 equivalent) of calcium acetate monohydrate are added. The mixture is heated to 180° C. under nitrogen and held at this temperature until hydrogen sulfide evolution is complete. It is then cooled to 150° C., blown with carbon dioxide for two hours, distilled under vacuum (20 mm.) at 207-215° C. to remove the volatile components, and filtered. The product, a 50% mineral oil solution, containing 1.04% sulfur and 14.8% calcium sulfate ash. The metal ratio is 2.56.

EXAMPLE 17

Following the procedure of Example 16, a basic calcium salicylate is prepared from 6 equivalents of calcium polyisobutene-substituted salicylate, 6 equivalents of sulfur, 11.25 equivalents of calcium hydroxide, 0.75 equivalent of calcium acetate, and 3171 parts of ethylene glycol monomethyl ether in 3582 parts of mineral oil. The product, a 50% oil solution, contains 15.63% calcium sulfate ash and 1.16% sulfur, and has a metal ratio of 2.86.

EXAMPLE 18

The procedure of Example 17 is repeated, except that the calcium acetate is replaced by an equivalent amount of lead butyrate and the diethylene glycol monomethyl ether is replaced by an equal weight of ethylene glycol monobutyl ether. A similar product is obtained.

EXAMPLE 19

Sodium hydroxide, 42 parts (1.05 equivalents), is added to a solution of 335 parts (1 equivalent) of dinonylphenol in 335 parts of xylene at 45° C. The mixture is heated under reflux for three hours with removal of water by azeotropic distillation. It is then cooled to 110° C. and blown with carbon dioxide for 2½ hours. The alkyl is then neutralized by dropwise addition of aqueous hydrochloric acid. The xylene is removed by vacuum distillation at 160° C. There is obtained a mixture of dinonylphenol and dinonylsalicylic acid.

A mixture of 200 parts (1.12 equivalents) of the above-described composition, 200 parts of diethylene glycol monomethyl ether, 36 parts (1.12 equivalents) of sulfur, 88 parts (2.38 equivalents) of calcium hydroxide and 4 parts (0.03 equivalent) of acetic acid in 300 parts of mineral oil is heated to 180° C. until sulfurization is complete as evidenced by the cessation of hydrogen sulfide evolution. The mixture is then cooled to 165° C. and blown with carbon dioxide for about 40 minutes. The volatile components are removed by vacuum distillation at temperatures up to 182° C. and the residue is filtered. The product contains 2.39% sulfur and 22.18% calcium sulfate ash, and has a metal ratio of 1.89.

The method of this invention, as described above, yields a product of high metal ratio and high sulfur content. The following examples are included for comparison purposes; in these examples certain of the promoter ingredients (components D and E) are omitted from the reaction mixture or replaced with substances whose use in similar processes is known in the art.

EXAMPLE 20

The procedure of Example 16 is repeated, except that 48.2 parts of calcium hydroxide is used, the calcium acetate monohydrate is replaced with an equivalent amount of acetic acid, and the diethylene glycol monomethyl ether is replaced with 189 parts of ethylene glycol. The maximum reaction temperature is 190° C. The product contains 0.48% sulfur, as compared with the product of Example 16 which contains 1.04% sulfur.

EXAMPLE 21

The procedure of Example 17 is repeated, except that 444 parts of calcium hydroxide are used and the calcium acetate is omitted. The product has a metal ratio of 2.33, as compared with the product of Example 17 which has a metal ratio of 2.86.

The basic, sulfurized salicylates prepared by the method of this invention are novel compositions of matter. Both the salicylates and phenates are useful as detergents in lubricating oils, automatic transmission fluids, gasolines and fuel oils. When used in lubricating oils and automatic transmission fluids, they are generally present in amounts ranging from about 0.5% to about 20% by weight. In fuel oils or gasolines, the optimum concentration is usually from about 0.0001% to about 1% by weight.

The lubricating oils in which the compositions prepared by the method of this invention are useful may be of synthetic, animal, vegetable or mineral origin. Ordinarily, mineral lubricating oils are preferred by reason of their availability, general excellence and low cost. For certain applications, oils belonging to one of the other three groups may be preferred; for instance, synthetic polyester oils such as didodecyl adipate and di-2-ethylhexyl sebacate are often preferred as jet engine lubricants. Normally, the lubricating oils preferred are liquids ranging in viscosity from about 40 SUS at 100° F. to about 200 SUS at 210° F.

This invention also contemplates the use of other additives with the products of this invention in lubricating compositions. Such additives include, for example, auxiliary detergents and dispersants of the ash-containing or ashless type, oxidation inhibiting agents, corrosion inhibiting agents, viscosity index improving agents, pour point depressing agents, extreme pressure agents, color stabilizers and anti-foam agents. For use in automatic transmission fluids, additional additives such as seal swellers may be included. The chemical natures of these other additives are well known to those skilled in the art and are disclosed in many patents and publications. Many of them are described in chapter 1 of "Lubricant Additives" by C. V. Smalheer and R. Kennedy Smith (Cleveland: Lezius-Hiles Company, 1967).

Lubricants A through J, described below, are illustrative of lubricating compositions containing the products of the method of this invention. Lubricant K is a lubricating composition that does not contain such a product and is presented to compare utility in a common test. The amounts given are on the basis of undiluted chemicals unless otherwise indicated.

Lubricant A (for railroad diesel use)

| | Parts |
|---|---|
| SAE 40 lubricating oil | 93.37 |
| Product of Example 2 | 3.55 |
| Reaction product of polyisobutenyl succinic anhydride, terephthalic acid and a polyethylene polyamine mixture | 0.91 |
| Reaction product of 1 equivalent of polyisobutenyl succinic anhydride with 1.36 equivalents of a polyethylene polyamine mixture | 1.10 |
| Oil solution of zinc di-(isooctyl)phosphorodithioate, containing about 7% phosphorus | 1.07 |
| Poly-(alkylsiloxane) anti-foam agent | .003 |

Lubricant B

| | |
|---|---|
| SAE 30 lubricating oil | 84.66 |
| Product of Example 8 | 5.55 |
| Basic barium salt of phosphosulfurized polyisobutene | 3.71 |
| Zinc salt of the reaction product of 1 equivalent of polyisobutenyl succinic anhydride with 1 equivalent of a polyethylene polyamine mixture | 3.35 |
| Zinc di-(tetrapropylene-substituted phenyl)-phosphorodithioate | 2.73 |
| Poly-(alkylsiloxane) anti-foam agent | .009 |

Lubricant C

| | |
|---|---|
| SAE 30 lubricating oil | 85.17 |
| Product of Example 14 | 5.55 |
| Basic barium petroleum sulfonate | 3.33 |
| Zinc salt of polyisbutenyl succinic anhydride-amine product described in Lubricant B | 3.33 |
| Zinc di-(tetrapropylene-substituted phenyl)phosphorodithioate | 2.62 |
| Poly-(alkylsiloxane) anti-foam agent | .009 |

Lubricant D

| | |
|---|---|
| SAE 30 lubricating oil | 84.05 |
| Product of Example 14 | 8.33 |
| Zinc salt of polyisobutenyl succinic anhydride-amine product described in Lubricant B | 5.00 |
| Zinc di-(tetrapropylene-substituted phenyl)phosphorodithioate | 2.62 |
| Poly-(alkylsiloxane) anti-foam agent | .009 |

Lubricant E

| | |
|---|---|
| SAE 30 lubricating oil | 79.19 |
| Product of Example 14 | 8.35 |
| Oil solution (4.78% calcium) of a reaction product of 99.2 parts of a basic calcium petroleum sulfonate with 0.8 part of anthranilic acid | 9.84 |
| Zinc di-(tetrapropylene-substituted phenyl)phosphorodithioate | 2.62 |
| Poly-(alkylsiloxane) anti-foam agent | .009 |

Lubricant F

| | |
|---|---|
| SAE 30 lubricating oil | 84.25 |
| Product of Example 15 | 6.00 |
| Zinc salt of polyisobutenyl succinic anhydride-amine product described in Lubricant B | 3.33 |
| Basic calcium salt of alkylphenol-formaldehyde reaction product | 3.80 |
| Zinc di-(tetrapropylene-substituted phenyl)phosphorodithioate | 2.62 |
| Poly-(alkylsiloxane) anti-foam agent | .003 |

Lubricant G

| | |
|---|---|
| SAE 30 lubricating oil | 79.19 |
| Product of Example 15 | 2.80 |
| Reaction product of 4 equivalents of polybutenyl succinic anhydride with 3 equivalents of a polyethylene polyamine mixture | .94 |
| Mixed zinc diisobutyl- and di-(n-amyl)phosphorodithioate | 0.79 |
| Poly-(alkylsiloxane) anti-foam agent | .003 |

Lubricant H

| | |
|---|---|
| SAE 30 lubricating oil | 83.31 |
| Product of Example 15 | 5.82 |
| Calcium sulfonate-anthranilic acid reaction product described in Lubricant E | 6.56 |
| Zinc salt of polyisobutenyl succinic anhydride-amine product described in Lubricant B | 1.50 |
| Zinc di-(tetrapropylene-substituted phenyl)phosphorodithioate-propylene oxide reaction product | 2.81 |
| Poly-(alkylsiloxane) anti-foam agent | .009 |

Lubricant J (automatic transmission fluid)

| | |
|---|---|
| Base oil (100 SUS at 100° F.) | 86.64 |
| Product of Example 15 | 2.86 |
| Polyacrylate viscosity index improver | 3.91 |
| Sulfurized hydrocarbon seal-swelling agent | 3.50 |
| Mixed zinc polyisobutenyl succinate and di-(chlorophenyl)phosphinodithioate | 2.07 |
| Oil solution of reaction product of 50 parts of a basic barium petroleum sulfonate with 1 part of anthranilic acid (contains 38.3% barium sulfate ash) | 0.99 |
| Poly-(alkylsiloxane) anti-foam agent | .0002 |
| Red dye | 0.03 |

Lubricant K

| | |
|---|---|
| SAE 30 lubricating oil | 84.32 |
| Oil solution of basic barium petroleum sulfonate (contains about 16% barium sulfate ash) | 5.00 |
| Calcium sulfonate-anthranilic acid reaction product described in Lubricant E | 6.56 |
| Zinc salt of polyisobutenyl succinic acid-amine product described in Lubricant B | 1.50 |
| Zinc di-(tetrapropylene-substituted phenyl)phosphorodithioate | 2.62 |
| Poly-(alkylsiloxane) anti-foam agent | .009 |

The effectiveness of the basic, sulfurized calcium salicylates of the present invention as detergents in motor oils in shown by a Caterpillar Engine Test. In this test, the lubricating composition to be tested is placed in the crankcase of a 4-stroke diesel test engine having a 5⅛ inch bore, operated at a constant speed and B.t.u. input. The condition of the testing operation are as follows.

| | |
|---|---|
| Speed | 1800±10 r.p.m. |
| Fuel rate | 7200±50 B.t.u./min., 0.37 lb./min. |
| Oil temperature | 225±3° F. |
| Oil pressure | 31 p.s.i. |
| Intake air temperature | 260±3° F. |
| Intake air pressure | 68.5±0.2 in. Hg abs. |

The piston is evaluated at 48-hour intervals for percent top groove filling and total deposits on lands, grooves, groove sides, ring sides, skirt, crown, and under the piston crown (on a scale of 0–100, 0 being indicative of extremely heavy deposits and 100 of no deposits).

When evaluated by this test, lubricant H (containing the basic, sulfurized calcium salicylate of this invention) shows, after 48 hours, 3% top groove filling and a total deposit rating of 90.0. By contrast, lubricant K (which does not contain the composition of this invention), after the same period of time, shows 34% top groove filling and a deposit rating of 84.0.

What is claimed is:

1. A method for the preparation of an oil-soluble, basic, sulfurized alkaline earth metal phenate which comprises reacting, at a temperature above about 150° C., (A) a phenol, (B) sulfur, and (C) an alkaline earth base, in the presence of a promoter comprising (D) about 5–20 mole percent, based on the amount of component A, of a carboxylic acid or an alkali metal, alkaline earth metal, zinc or lead salt thereof and (E) as a solvent, a compound of the formula R(OR')$_x$OH, wherein R is hydrogen or alkyl, R' is alkylene and $x$ is an integer which is at least 2 if R is hydrogen and at least 1 if R is alkyl, said component E having a boiling point above about 150° C.; the ratio of the number of equivalents of component B to component A being between about 1:1 and 2:1 and the ratio of the number of equivalents of component C to component A being at least about 2:1; and subsequently removing all volatile components from the reaction product.

2. The method of claim 1 wherein component A is an alkyl phenol wherein the alkyl group contains at least about 6 carbon atoms.

3. The method of claim 2 wherein the alkyl radical is derived from a polymer of isobutene and contains about 10–125 aliphatic carbon atoms.

4. The method of claim 2 wherein component C is calcium oxide or hydroxide.

5. The method of claim 2 wherein component D is an aliphatic acid containing about 2–6 carbon atoms or an alkaline earth metal salt thereof.

6. The method of claim 5 wherein component D is acetic acid or calcium acetate.

7. The method of claim 2 wherein R of component E is alkyl and $x$ is 2 or 3.

8. The method of claim 7 wherein component E is ethylene glycol monoethyl ether.

9. The method of claim 2 wherein the reaction mixture is reacted with carbon dioxide at a temperature of about 130–180° C., prior to the removal of volatile components.

10. The method of claim 9 wherein component A is a polyisobutenyl phenol wherein the polyisobutenyl radical contains about 10–125 aliphatic carbon atoms; component C is calcium hydroxide; component D is acetic acid or calcium acetate; component E is diethylene glycol monoethyl ether; the reaction temperature during formation of the basic sulfide is about 150–200° C., and the volatile components are removed by distillation.

11. The method of claim 1 wherein component A is an alkyl salicylic acid or alkaline earth metal salt thereof wherein the alkyl group contains at least about 6 carbon atoms.

12. The method of claim 11 wherein the reaction mixture is reacted with carbon dioxide at a temperature of about 130–180° C., prior to the removal of volatile components.

13. The method of claim 12 wherein the alkyl radical is derived from a polymer of isobutene and contains about 10–125 aliphatic carbon atoms.

14. The method of claim 12 wherein component C is calcium oxide or hydroxide.

15. The method of claim 12 wherein component D is an aliphatic acid containing about 2–6 atoms or an alkaline earth metal salt thereof.

16. The method of claim 15 wherein component D is acetic acid or calcium acetate.

17. The method of claim 12 wherein R of component E is alkyl and $x$ is 2 or 3.

18. The method of claim 17 wherein component E is ethylene glycol monoethyl ether.

19. The method of claim 12 wherein component A is a polyisobutenyl salicylic acid or alkaline earth metal salt thereof wherein the polyisobutenyl radical contains about 10–125 aliphatic carbon atoms; component C is calcium hydroxide; component D is acetic acid or calcium acetate; component E is diethylene glycol monoethyl ether; the reaction temperature during formation of the basic sulfide is about 150–200° C., and the volatile components are removed by distillation.

20. The product of the method of claim 11.
21. The product of the method of claim 12.
22. The product of the method of claim 13.
23. The product of the method of claim 14.
24. The product of the method of claim 19.

25. A lubricating composition comprising a major amount of a mineral lubricating oil and a minor amount of the composition of claim 21.

26. A lubricating composition comprising a major amount of a mineral lubricating oil and a minor amount of the composition of claim 24.

References Cited

UNITED STATES PATENTS

| | | | |
|---|---|---|---|
| 2,366,873 | 1/1945 | Reiff | 252—42.7 |
| 2,366,874 | 1/1945 | Reiff | 252—42.7 |
| 2,409,687 | 10/1946 | Rogers et al. | 252—42 XR |
| 2,680,096 | 6/1954 | Walker et al. | 252—42.7 |
| 2,766,291 | 10/1956 | Weissberg et al. | 252—42.7 XR |
| 3,036,971 | 5/1962 | Otto | 252—42.7 |
| 3,044,961 | 7/1962 | Morway et al. | 252—42.7 XR |

DANIEL E. WYMAN, *Primary Examiner.*

W. H. CANNON, *Assistant Examiner.*

UNITED STATES PATENT OFFICE
CERTIFICATE OF CORRECTION

Patent No. 3,410,798　　　　　　　　　　　November 12, 1968

Jerome M. Cohen

It is hereby certified that error appears in the above numbered patent requiring correction and that the said Letters Patent should read as corrected below.

Column 2, line 47, for "silicylic" read -- salicylic --; line 70, for "salicyaltes" read -- salicylates --; column 3, line 29, for "aectic" read -- acetic --; column 5, line 42, for "1.71," read -- 1.71. --; column 7, lines 41 and 42, for "polyisobutyl" read -- -- polyisobutenyl --; line 64, for "containing" read -- contains --; column 9, line 43, for "Zine" read -- Zinc --; column 10, line 61, for "in" read -- is --; column 11, lines 46 and 56, for "monoethyl", each occurrence, read -- monomethyl --; column 12, line 15, after "2-6" insert -- carbon --; lines 22 and 28, for "monoethyl", each occurrence, read -- monomethyl --.

Signed and sealed this 27th day of May 1969.

(SEAL)
Attest:

EDWARD M. FLETCHER, JR.
Attesting Officer

Commissioner of Patents